May 31, 1927.
M. J. FLEMING
1,630,931
BELT SHIFTER FOR STEPPED PULLEYS
Filed Oct. 23, 1925
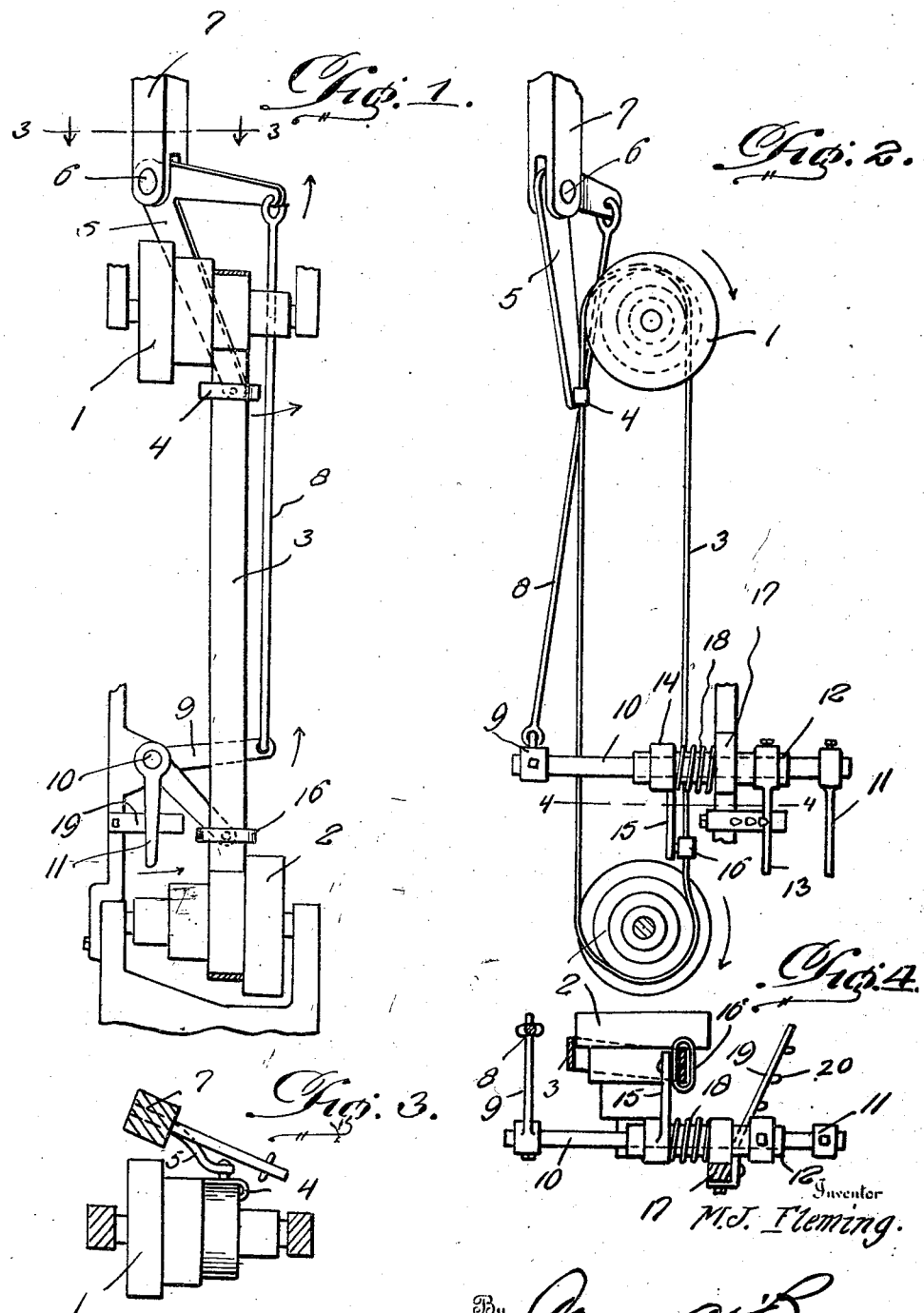

Patented May 31, 1927.

1,630,931

UNITED STATES PATENT OFFICE.

MICHAEL J. FLEMING, OF ELY, MINNESOTA.

BELT SHIFTER FOR STEPPED PULLEYS.

Application filed October 23, 1925. Serial No. 64,384.

My present invention pertains to driving connections for machinery of various descriptions, and it has for its general object the provision of simple and efficient means, manually operable and adapted for the quick and easy shifting of a belt relative to stepped pulleys for variable speeds.

To the attainment of the foregoing, the invention consists in the improvement as hereinafter described and definitely claimed.

In the accompanying drawing, forming part of this specification:—

Figure 1 is a face view, partly in section, illustrating one embodiment of my invention as properly installed.

Figure 2 is an elevation taken at right angles to Figure 1.

Figure 3 is a fragmentary horizontal section taken in the plane indicated by the line 3—3 of Figure 1, looking downwardly.

Figure 4 is a horizontal section taken in the plane indicated by the line 4—4 of Figure 2.

Similar numerals of reference designate corresponding parts in all of the views of the drawings.

I show in Figures 1 and 2, an upper stepped pulley 1, and a lower stepped pulley 2, the said pulleys being arranged in suitable mountings and being connected by a shiftable belt 3.

At the point adjacent to the upper pulley 1 the belt 3 is carried through an open loop form, the said loop form 4 being carried by one arm of a bell crank 5, fulcrumed at 6 in a fixed support 7. The other arm of said bell crank 5 is connected through a rod 8 with an arm 9 on a transverse rock shaft 10, arranged as illustrated relative to the lower pulley 2. The said rock shaft 10 is provided at 11 with a hand lever, and loosely mounted on the rock shaft 10 and movable rectilinearly thereon and also movable about the shaft 10 is a sleeve 12, the said sleeve 12 being provided with a hand lever 13 and also with an abutment 14 which latter preferably forms part of an arm 15 that carries a loop 16 through which the belt 3 passes at a point adjacent to the lower pulley 2 as illustrated. It will also be noticed that the shaft 10 passes through a bracket 17, and that a spring 18 is coiled about the sleeve 12 and is interposed between the said bracket 17 and the foregoing mentioned abutment 14 on the sleeve, the said spring 18 tending to move the sleeve 12 and its appurtenances toward the left in Figure 2.

Carried by the bracket 17 in fixed relation thereto is a rack 19 on which are spaced keepers 20. It will be observed on comparison of Figures 1 and 3 that the bell crank 5 is generally inclined consonant with the taper or inclination of the upper pulley 1, and by comparison of Figures 1, 2 and 4, it will be noted that the rack 19 is inclined correspondingly to the stepped reduction of the lower pulley 2 from one end to the other. From this it will be understood that the movement of the hand lever 13 will be in line with the taper of the lower pulley 2; also, that in disengaging the hand lever 13 from any one of the keepers 20 on the rack 19, the hand lever 13 must necessarily be given such a movement as to permit the arm 15 and loop 16 to move the belt 3 from one step to another. It will also be understood that the arrangement described of the bell crank 5 relative to the upper pulley 1 assures the maintenance of the loop 4 in proper relation to the belt 3 at all times and in all positions of the belt. Incident to the shifting of the belt from a larger step to a smaller step, the spring 18 will operate to automatically move the arm 15, thereby assuring the prompt arrangement of the belt in the new position.

In the practical operation of my improvement it will be understood that for the shifting of the belt 3 to a larger step on the lower pulley 2, it is simply necessary to pull the hand lever 11 forwardly, whereupon the belt will be run off the upper pulley 1, and thus when the lever 13 is moved the belt will be shifted to a larger step of the lower pulley 2.

The illustrated embodiment of my invention has been found to be very effective for the shifting of belts of considerable width, two and half inches and wider, but I would have it understood that when narrow belts are to be shifted, my improvement may be simplified by altogether omitting the sleeve 12, the hand lever 13 and its appurtenances, and fixing the arm 15 directly to the rock shaft 10. Notwithstanding this modified construction the material simplification of that shown, the said modified construction will be found to constitute a highly efficient shifter for narrow belts.

Manifestly in the operation of the illustrated embodiment and in the operation of the simplified embodiment alluded to, but very little effort on the part of the operator is necessary for the quick and proper shifting of the belt. It will also be appreciated that the organized mechanism is generally simple and inexpensive in construction and is generally well adapted to withstand the usage to which mechanism of corresponding character is ordinarily subjected.

The construction illustrated constitutes the best practical embodiment of my invention of which I am cognizant, and while I have specifically described the construction and relative arrangement of the parts in order to impart a full, clear and exact understanding of said embodiment, I do not desire to be understood as confining myself to the structural details, invention being defined by my appended claims within the scope of which structural changes may be made without departure from my invention.

Having described my invention, what I claim and desire to secure by Letters Patent, is:—

1. In a belt shifting means, the combination of spaced, reversely arranged stepped pulleys, movable means arranged adjacent to one of said pulleys and having a belt receiver, a rock shaft arranged adjacent to the other pulley and connected and adapted to operate the said movable means, said rock shaft being equipped for its manual turning, a sleeve on said rock shaft and movable about and rectilinearly of the rock shaft, an arm carried by said sleeve and having a belt receiver, a hand lever fixed to the sleeve, a stationary abutment, spring means for cooperating with said abutment and said sleeve to thrust the latter endwise in one direction, and a rack inclined correspondingly to the taper of the last-named stepped pulley, and having spaced keeper portions; the said arm in engagement with the belt at a point adjacent to the last-named pulley constituting one abutment for the coiled spring means, and the said spring means being arranged about the sleeve between the said arm and the said stationary abutment.

2. In belt shifting means, the combination of spaced reversely stepped pulleys, a belt complementary to the said pulleys, a bell crank disposed in general parallelism to the taper of one pulley and arranged adjacent to said pulley and having a belt receiver, a bracket arranged adjacent to the other pulley, a rack carried in fixed relation by said bracket and arranged in parallelism to the taper of the other pulley and having spaced keepers at its side remote from said pulley, a rock shaft mounted in said bracket and having a hand lever and also having an arm, a rod connection between said arm and one arm of said bell crank, a sleeve loose on the said rock shaft and having a hand lever for cooperation with said rack and also having an arm provided with a belt receiver, and a spring coiled about the sleeve and interposed between the last-named arm and the bracket and tending to move the sleeve in such direction as to yieldingly maintain the hand lever of the sleeve in yielding engagement with the rack.

3. In a belt shifting means for a stepped pulley, a shaft arranged adjacent to the pulley, a sleeve on said shaft and movable about and rectilinearly of the shaft, an arm carried by said sleeve and having a belt receiver, a hand lever fixed to the sleeve, a stationary abutment, spring means for cooperating with said abutment and with said sleeve to thrust the latter endwise in one direction, and a rack inclined correspondingly to the taper of the stepped pulley and having spaced keeper portions.

In testimony whereof I affix my signature.

MICHAEL J. FLEMING.